United States Patent
Gelmetti et al.

(10) Patent No.: US 10,343,231 B2
(45) Date of Patent: Jul. 9, 2019

(54) WIRE FEEDING SYSTEM

(71) Applicant: AWDS TECHNOLOGIES SRL, Rovereto (TN) (IT)

(72) Inventors: Carlo Gelmetti, Lazise (IT); Filippo Corradini, Isera (IT); Fabio Perazzoli, Lazise (IT)

(73) Assignee: AWDS TECHNOLOGIES SRL (IT)

( * ) Notice: Subject to any disclaimer, the term of this patent is extended or adjusted under 35 U.S.C. 154(b) by 61 days.

(21) Appl. No.: 14/289,090

(22) Filed: May 28, 2014

(65) Prior Publication Data
US 2015/0343552 A1 Dec. 3, 2015

(51) Int. Cl.
*B23K 9/12* (2006.01)
*B23K 9/133* (2006.01)
(Continued)

(52) U.S. Cl.
CPC ............ *B23K 9/124* (2013.01); *B23K 9/125* (2013.01); *B23K 9/133* (2013.01); *B23K 9/1336* (2013.01);
(Continued)

(58) Field of Classification Search
CPC ........ B23K 9/124; B23K 9/125; B23K 9/133; B23K 9/1336; B65H 51/10; B65H 51/30; B65H 2701/36
(Continued)

(56) References Cited

U.S. PATENT DOCUMENTS 318,062 A    5/1885  Warren
532,565 A    1/1895  Kilmer
(Continued)

FOREIGN PATENT DOCUMENTS

CN    1466469    1/2004    ............ A61L 15/60
CN    1626423    6/2005    ............ B65H 75/16
(Continued)

OTHER PUBLICATIONS

Extended European Search Report issued in application No. 15168866. 0, dated Dec. 22, 2015 (6 pgs).
(Continued)

*Primary Examiner* — Dana Ross
*Assistant Examiner* — Ket D Dang
(74) *Attorney, Agent, or Firm* — Hayes Soloway P.C.

(57) ABSTRACT

An auxiliary wire feeder has a pushing device for advancing welding wire, a control device for controlling the pushing device, and an electric contact adapted for being in electrical connection with the welding wire. The electric contact is connected to the control device for supplying a control signal to the control device. A welding system comprises an auxiliary wire feeder of this kind and further a welding torch, a main wire feeder, a wire guide for guiding welding wire from a supply to the welding torch and a welding current contact for supplying welding current to the welding wire. For controlling an auxiliary wire feeder in a welding system having a welding torch, a main wire feeder, a wire guide for guiding welding wire from a supply to the welding torch, a welding current contact for supplying welding current to the welding wire, the control of the auxiliary welding wire feeder is responsive to an electrical signal transmitted via the welding wire.

12 Claims, 4 Drawing Sheets

(51) Int. Cl.
*B65H 51/30* (2006.01)
*B65H 51/10* (2006.01)

(52) U.S. Cl.
CPC ............ *B65H 51/10* (2013.01); *B65H 51/30* (2013.01); *B65H 2701/36* (2013.01)

(58) Field of Classification Search
USPC .............. 219/121.27, 137.44, 137.61, 137.7, 219/137.71, 137.2–137.9, 127, 132; 226/24, 25; 228/247, 256, 41; 242/554.5
See application file for complete search history.

(56) References Cited

U.S. PATENT DOCUMENTS

| | | | |
|---|---|---|---|
| 617,353 A | 1/1899 | Redmond | |
| 627,722 A | 6/1899 | Edwards | |
| 932,808 A | 8/1909 | Pelton | |
| 1,276,117 A | 8/1918 | Riebe | 464/171 |
| 1,468,994 A | 9/1923 | Cook | 206/393 |
| 1,508,689 A | 9/1924 | Glasser | 219/124.03 |
| 1,640,368 A | 8/1927 | Obetz | |
| 1,821,354 A | 9/1931 | Meyer | 242/159 |
| 1,907,051 A | 5/1933 | Emery | |
| 1,936,227 A | 11/1933 | Cook | 206/59 |
| 2,027,670 A | 1/1936 | Broeren | 312/62 |
| 2,027,674 A | 1/1936 | Broeren | 312/60 |
| 2,059,462 A | 11/1936 | Jungmann | |
| 2,078,161 A * | 4/1937 | Eberhard | B23K 9/1336 219/124.01 |
| 2,329,369 A | 9/1943 | Haver | 285/11 |
| 2,366,101 A | 12/1944 | Grothey | 66/125 R |
| 2,407,746 A | 9/1946 | Johnson | |
| 2,457,910 A | 1/1949 | McLaren et al. | 74/501 |
| 2,477,059 A | 7/1949 | Hill | 242/137.1 |
| 2,483,760 A | 10/1949 | Duncan | 254/190 |
| 2,579,131 A | 12/1951 | Tinsley | 206/409 |
| 2,580,900 A | 1/1952 | Epstein | 206/409 |
| 2,679,571 A | 5/1954 | Chappel | 219/137.44 |
| 2,694,130 A | 11/1954 | Howard | 219/8 |
| 2,713,938 A | 7/1955 | Snyder | |
| 2,724,538 A | 11/1955 | Schweich | |
| 2,752,108 A | 6/1956 | Richardson | 242/128 |
| 2,838,922 A | 6/1958 | Gift | 66/125 R |
| 2,849,195 A | 8/1958 | Richardson | |
| 2,864,565 A | 12/1958 | Whearly | 242/128 |
| 2,869,719 A | 1/1959 | Hubbard | |
| 2,880,305 A | 3/1959 | Baird | |
| 2,911,166 A | 11/1959 | Haugwitz | 242/128 |
| 2,916,944 A * | 12/1959 | Franz Diesfeld | 192/21.5 |
| 2,929,576 A | 3/1960 | Henning | |
| 2,966,258 A | 12/1960 | Krafft | |
| 2,974,850 A | 3/1961 | Mayer | |
| 2,984,596 A | 5/1961 | Franer | 206/412 |
| 3,022,415 A | 2/1962 | Francois | 219/137.44 |
| 3,096,951 A | 7/1963 | Jenson | 242/137.1 |
| 3,108,180 A | 10/1963 | Linnander | 219/137.44 |
| 3,119,042 A | 1/1964 | Bond | |
| 3,185,185 A | 5/1965 | Pfund | |
| 3,244,347 A | 4/1966 | Jenk | |
| 3,274,850 A | 9/1966 | Tascio | 74/501 |
| 3,283,121 A | 11/1966 | Bernard et al. | 219/137.44 |
| 3,284,608 A | 11/1966 | McDonald | 219/137.43 |
| 3,344,682 A | 10/1967 | Bratz | 74/501 |
| 3,352,412 A | 11/1967 | Draving et al. | 206/59 |
| 3,433,504 A | 3/1969 | Hanes | 285/93 |
| 3,463,416 A | 8/1969 | Quenot | 242/396.9 |
| 3,478,435 A | 11/1969 | Cook | |
| 3,491,876 A | 1/1970 | Zecchin | |
| 3,512,635 A | 5/1970 | Lang | |
| 3,536,888 A | 10/1970 | Borneman | 219/137.43 |
| 3,565,129 A | 2/1971 | Field | |
| 3,567,900 A | 3/1971 | Nelson | |
| 3,576,966 A | 5/1971 | Sullivan | |
| 3,586,222 A | 6/1971 | Rosen | 226/1 |
| 3,595,277 A | 7/1971 | Lefever | |
| 3,630,425 A | 12/1971 | Wilkens | 226/108 |
| 3,648,920 A | 3/1972 | Stump | |
| 3,672,655 A | 6/1972 | Carter | 226/108 |
| 3,675,499 A | 7/1972 | Marosy | 24/573.11 |
| 3,690,567 A | 9/1972 | Borneman | 239/591 |
| 3,724,249 A | 4/1973 | Asbeck et al. | |
| 3,729,092 A | 4/1973 | Marcell | |
| 3,730,136 A | 5/1973 | Okada | 118/78 |
| 3,799,215 A | 3/1974 | Willems | |
| 3,815,842 A | 6/1974 | Scrogin | 242/423.1 |
| 3,823,894 A | 7/1974 | Frederick et al. | 242/137.1 |
| 3,901,425 A * | 8/1975 | Taylor | B23K 9/1336 226/108 |
| 3,939,978 A | 2/1976 | Thomaswick | 206/454 |
| 4,000,797 A | 1/1977 | Ducanis | 193/38 |
| 4,043,331 A | 8/1977 | Martin et al. | 128/156 |
| 4,044,583 A | 8/1977 | Kinney, Jr. | |
| 4,074,105 A | 2/1978 | Minehisa et al. | |
| 4,097,004 A | 6/1978 | Reese | 242/129 |
| 4,102,483 A | 7/1978 | Ueyama et al. | |
| 4,113,795 A | 9/1978 | Izawa et al. | 524/84 |
| 4,127,590 A | 11/1978 | Endo et al. | 260/346.74 |
| 4,157,436 A | 6/1979 | Endo et al. | 528/167 |
| 4,161,248 A | 7/1979 | Kalmanovitch | 206/389 |
| 4,171,783 A | 10/1979 | Waltemath | 242/128 |
| 4,172,375 A | 10/1979 | Rushforth et al. | |
| 4,188,526 A | 2/1980 | Asano | |
| 4,222,535 A | 9/1980 | Hosbein | 242/128 |
| 4,254,322 A | 3/1981 | Asano | |
| 4,274,607 A | 6/1981 | Priest | 242/163 |
| 4,280,951 A | 7/1981 | Saito et al. | 524/118 |
| 4,293,103 A | 10/1981 | Tsukamoto | |
| 4,354,487 A | 10/1982 | Oczkowski et al. | 604/366 |
| 4,392,606 A | 7/1983 | Fremion | 206/600 |
| 4,396,797 A | 8/1983 | Sakuragi et al. | 174/68 |
| 4,429,001 A | 1/1984 | Kolpin et al. | 442/340 |
| 4,451,014 A | 5/1984 | Kitt et al. | 242/128 |
| 4,464,919 A | 8/1984 | Labbe | |
| 4,500,315 A | 2/1985 | Pieniak et al. | 604/379 |
| 4,531,040 A | 7/1985 | Nawa | 219/136 |
| 4,540,225 A | 9/1985 | Johnson et al. | 439/192 |
| 4,546,631 A | 10/1985 | Eisinger | |
| 4,575,612 A | 3/1986 | Prunier | 219/137.43 |
| 4,581,514 A | 4/1986 | Inoue | 204/225 |
| 4,582,198 A | 4/1986 | Ditton | |
| 4,585,487 A | 4/1986 | Destree et al. | |
| 4,623,063 A | 11/1986 | Balkin | |
| 4,737,567 A | 4/1988 | Matsumoto et al. | 528/167 |
| 4,742,088 A | 5/1988 | Kim | 521/118 |
| 4,826,497 A | 5/1989 | Marcus et al. | 604/359 |
| 4,855,179 A | 8/1989 | Bourland et al. | 442/409 |
| 4,868,366 A * | 9/1989 | Joseph | B23K 9/10 219/127 |
| 4,869,367 A | 9/1989 | Kawasaki et al. | 206/409 |
| 4,891,493 A | 1/1990 | Sato et al. | 219/137 |
| 4,916,282 A | 4/1990 | Chamming et al. | 219/69.2 |
| 4,918,286 A | 4/1990 | Boyer | 219/137.44 |
| 4,949,567 A | 8/1990 | Corbin | 72/164 |
| 4,974,789 A | 12/1990 | Milburn | 242/159 |
| 5,051,539 A | 9/1991 | Leathers-Wiessner | 174/15.7 |
| 5,061,259 A | 10/1991 | Goldman et al. | 604/368 |
| 5,078,269 A | 1/1992 | Dekko et al. | 206/397 |
| 5,100,397 A | 3/1992 | Poccia et al. | 604/365 |
| 5,105,943 A | 4/1992 | Lesko et al. | 206/397 |
| 5,109,983 A | 5/1992 | Malone et al. | 206/408 |
| 5,147,646 A | 9/1992 | Graham | 424/424 |
| 5,165,217 A | 11/1992 | Sobel et al. | 242/159 |
| 5,201,419 A | 4/1993 | Hayes | 206/409 |
| 5,205,412 A | 4/1993 | Krieg | 206/394 |
| 5,215,338 A | 6/1993 | Kimura et al. | 285/166 |
| 5,227,314 A | 7/1993 | Brown et al. | 437/10 |
| 5,261,625 A | 11/1993 | Lanoue | 242/129.8 |
| 5,277,314 A | 1/1994 | Cooper et al. | 206/398 |
| 5,314,111 A | 5/1994 | Takaku et al. | 229/110 |
| 5,368,245 A | 11/1994 | Fore | 242/171 |
| 5,372,269 A | 12/1994 | Sutton et al. | 220/62 |
| 5,452,841 A | 9/1995 | Sibata et al. | 228/180.5 |
| 5,485,968 A | 1/1996 | Fujioka | 242/172 |

(56) References Cited

U.S. PATENT DOCUMENTS

| | | | |
|---|---|---|---|
| 5,494,160 A | 2/1996 | Gelmetti | 206/395 |
| 5,530,088 A | 6/1996 | Sheen et al. | 528/287 |
| 5,553,810 A | 9/1996 | Bobeczko | 242/601 |
| 5,562,646 A | 10/1996 | Goldman et al. | 604/368 |
| 5,585,013 A | 12/1996 | Truty | 219/69.12 |
| 5,586,733 A | 12/1996 | Miura et al. | 242/125.2 |
| 5,590,848 A | 1/1997 | Shore et al. | 242/361 |
| 5,629,377 A | 5/1997 | Burgert et al. | 524/832 |
| 5,665,801 A | 9/1997 | Chang et al. | 524/125 |
| 5,692,700 A | 12/1997 | Bobeczko | 242/588.2 |
| 5,714,156 A | 2/1998 | Schmidt et al. | 424/404 |
| 5,738,209 A | 4/1998 | Burr et al. | 206/397 |
| 5,739,704 A | 4/1998 | Clark | 326/62 |
| 5,746,380 A | 5/1998 | Chung | 242/171 |
| 5,758,834 A | 6/1998 | Dragoo et al. | 242/128 |
| 5,778,939 A | 7/1998 | Hok-Yin | 138/120 |
| 5,816,466 A | 10/1998 | Seufer | 226/187 |
| 5,819,934 A | 10/1998 | Cooper | 206/397 |
| 5,845,862 A | 12/1998 | Cipriani | 242/423.1 |
| 5,847,184 A | 12/1998 | Kleiner | 558/73 |
| 5,865,051 A | 2/1999 | Otzen et al. | 72/17.3 |
| 5,921,391 A | 7/1999 | Ortiz et al. | 206/397 |
| 5,931,408 A | 8/1999 | Ishii et al. | 242/580 |
| 5,932,123 A | 8/1999 | Marhofer | 219/125.11 |
| 5,971,308 A | 10/1999 | Boulton | 242/131 |
| 5,988,370 A | 11/1999 | Roemer et al. | 206/215 |
| 5,990,377 A | 11/1999 | Chen et al. | 604/381 |
| 6,016,911 A | 1/2000 | Chen | 200/395 |
| 6,019,303 A | 2/2000 | Cooper | 424/361.4 |
| 6,103,358 A | 8/2000 | Bruggermann et al. | 428/317.9 |
| 6,150,632 A | 11/2000 | Fisher | 219/137.71 |
| 6,159,591 A | 12/2000 | Beihoffer et al. | 428/327 |
| 6,236,017 B1 | 5/2001 | Smartt | 219/130.01 |
| 6,237,768 B1 | 5/2001 | Cipriani | 206/408 |
| 6,245,880 B1 | 6/2001 | Takeuchi et al. | 528/287 |
| 6,255,371 B1 | 7/2001 | Schlosser et al. | 524/100 |
| 6,260,781 B1 | 7/2001 | Cooper | 424/361.4 |
| 6,301,944 B1 | 10/2001 | Offer | 72/79 |
| 6,322,016 B1 | 11/2001 | Jacobsson et al. | 424/356.4 |
| 6,340,522 B1 | 1/2002 | Burke et al. | 428/359 |
| 6,408,888 B1 | 6/2002 | Baeumer et al. | 138/120 |
| 6,409,116 B1 | 6/2002 | Brown | 242/419.1 |
| 6,417,425 B1 | 7/2002 | Whitmore et al. | 604/367 |
| 6,425,549 B1 | 7/2002 | Bae et al. | 242/580 |
| 6,464,077 B1 | 10/2002 | Liu | 206/388 |
| 6,479,793 B1 | 11/2002 | Wittmann | 219/130.5 |
| 6,481,892 B1 | 11/2002 | Agostini | 384/43 |
| 6,498,227 B1 | 12/2002 | Horie | 528/176 |
| 6,524,010 B1 | 2/2003 | Derman | 384/513 |
| 6,547,176 B1 | 4/2003 | Blain et al. | 242/423.1 |
| 6,564,943 B2 | 5/2003 | Barton et al. | 206/395 |
| 6,613,848 B1 | 9/2003 | Wang et al. | 525/481 |
| 6,636,776 B1 | 10/2003 | Barton et al. | 700/169 |
| 6,648,141 B2 | 11/2003 | Land | 206/408 |
| 6,649,870 B1 | 11/2003 | Barton et al. | 219/137 |
| 6,708,864 B2 | 3/2004 | Ferguson, III et al. | 228/56.3 |
| 6,715,608 B1 | 4/2004 | Moore | 206/397 |
| 6,745,899 B1 | 6/2004 | Barton | 206/409 |
| 6,749,136 B1 | 6/2004 | Speck | |
| 6,750,262 B1 | 6/2004 | Hahnle et al. | 521/64 |
| 6,753,454 B1 | 6/2004 | Smith et al. | 602/41 |
| 6,821,454 B2 | 11/2004 | Visca et al. | 34/341 |
| 6,831,142 B2 | 12/2004 | Mertens et al. | 526/328.5 |
| 6,831,251 B1 * | 12/2004 | Artelsmair | B23K 9/1336 219/137.71 |
| 6,872,275 B2 | 3/2005 | Ko et al. | 156/181 |
| 6,889,835 B2 | 5/2005 | Land | 206/408 |
| 6,913,145 B2 | 7/2005 | Barton | 206/409 |
| 6,938,767 B2 | 9/2005 | Gelmetti | 206/408 |
| 6,977,357 B2 | 12/2005 | Hsu et al. | 219/130.01 |
| 7,004,318 B2 | 2/2006 | Barton | 206/409 |
| 7,108,916 B2 | 9/2006 | Ehrnsperger et al. | 428/403 |
| 7,147,176 B2 | 12/2006 | Rexhaj | 242/417.3 |
| 7,152,735 B2 | 12/2006 | Dragoo et al. | 206/408 |
| 7,156,334 B1 | 1/2007 | Fore et al. | 242/171 |
| 7,178,755 B2 | 2/2007 | Hsu et al. | 242/423.1 |
| 7,198,152 B2 | 4/2007 | Barton et al. | 206/409 |
| 7,220,942 B2 | 5/2007 | Barton et al. | 219/137.7 |
| 7,301,124 B2 | 11/2007 | Kaufman | 219/137.71 |
| 7,309,038 B2 | 12/2007 | Carroscia | 206/409 |
| 7,377,388 B2 | 5/2008 | Hsu et al. | 206/389 |
| RE40,351 E | 6/2008 | Cipriani | 242/423.1 |
| 7,398,881 B2 | 7/2008 | Barton et al. | 206/408 |
| 7,410,111 B2 | 8/2008 | Carroscia | 242/566 |
| 7,441,657 B2 | 10/2008 | Gelmetti | 206/393 |
| 7,441,721 B2 | 10/2008 | Bae et al. | 242/128 |
| 7,533,906 B2 | 5/2009 | Luettgen et al. | 285/146.1 |
| 7,563,840 B2 | 7/2009 | Ye | 524/449 |
| 7,748,530 B2 | 7/2010 | Hsu et al. | 206/408 |
| 7,950,523 B2 | 5/2011 | Gelmetti | 206/408 |
| 8,207,475 B2 | 6/2012 | Minato et al. | 219/137.31 |
| 8,225,977 B2 * | 7/2012 | Meckler | B23K 9/125 226/1 |
| 8,235,210 B2 | 8/2012 | De Lacerda et al. | 206/393 |
| 9,414,759 B2 | 8/2016 | Lang | A61B 5/04087 |
| 2001/0014706 A1 | 8/2001 | Sprenger et al. | 523/400 |
| 2001/0020663 A1 | 9/2001 | Petersen | 242/485.7 |
| 2002/0000391 A1 | 1/2002 | Kawasai et al. | 206/408 |
| 2002/0003014 A1 | 1/2002 | Homma | |
| 2002/0014477 A1 | 2/2002 | Lee et al. | |
| 2002/0039869 A1 | 4/2002 | Achille | 442/417 |
| 2002/0108985 A1 | 8/2002 | Garcia et al. | 226/45 |
| 2002/0120178 A1 | 8/2002 | Tartaglia et al. | 600/114 |
| 2003/0042162 A1 | 3/2003 | Land | 206/408 |
| 2003/0042163 A1 | 3/2003 | Cipriant | |
| 2003/0052030 A1 | 3/2003 | Gelmetti | 206/397 |
| 2003/0184086 A1 | 10/2003 | Christianson | 285/146.1 |
| 2004/0004113 A1 * | 1/2004 | Blankenship | B23K 9/1062 235/375 |
| 2004/0011776 A1 * | 1/2004 | Mukai | B23K 9/1336 219/137.71 |
| 2004/0020041 A1 | 2/2004 | Ferguson, III et al. | |
| 2004/0050441 A1 | 3/2004 | Roschi | 138/120 |
| 2004/0133176 A1 | 7/2004 | Muthiah et al. | 604/368 |
| 2004/0155090 A1 | 8/2004 | B.-Jensen | |
| 2004/0176557 A1 | 9/2004 | Mertens et al. | 526/328.5 |
| 2004/0186244 A1 | 9/2004 | Hatsuda et al. | 525/451 |
| 2004/0201117 A1 | 10/2004 | Anderson | 264/4.3 |
| 2004/0241333 A1 | 12/2004 | Cielenski et al. | 427/421.1 |
| 2004/0265387 A1 | 12/2004 | Hermeling et al. | 424/486 |
| 2005/0008776 A1 | 6/2005 | Chhabra et al. | 427/180 |
| 2005/0230372 A1 * | 10/2005 | Ott | B23K 9/1087 219/132 |
| 2005/0258290 A1 | 11/2005 | Kuper | 242/171 |
| 2005/0261461 A1 | 11/2005 | Maeda et al. | 528/272 |
| 2006/0016792 A1 * | 1/2006 | Uecker | B23K 9/0735 219/137.71 |
| 2006/0027699 A1 | 2/2006 | Bae et al. | |
| 2006/0070987 A1 | 4/2006 | Daniel | 219/137.71 |
| 2006/0074154 A1 | 4/2006 | Harashina et al. | 524/115 |
| 2006/0131293 A1 | 6/2006 | Kaufman | 219/137.71 |
| 2006/0138116 A1 | 6/2006 | Lipnevicius | 219/137.71 |
| 2006/0155254 A1 | 7/2006 | Sanz et al. | 604/378 |
| 2006/0207981 A1 | 9/2006 | Diekmann et al. | 219/137.2 |
| 2006/0247343 A1 | 11/2006 | Kishimoto et al. | 524/117 |
| 2006/0258824 A1 | 11/2006 | Oshima et al. | 525/533 |
| 2006/0278747 A1 | 12/2006 | Carroscia | |
| 2007/0056943 A1 | 3/2007 | Tenbrink | 219/130.01 |
| 2007/0080154 A1 * | 4/2007 | Ott | B23K 9/095 219/132 |
| 2007/0151964 A1 | 7/2007 | Artelsmair et al. | 219/137.2 |
| 2007/0158324 A1 * | 7/2007 | O'Donnell | B23K 9/1068 219/137.71 |
| 2007/0175786 A1 | 8/2007 | Nicklas | |
| 2007/0175965 A1 | 8/2007 | Carroscia | 228/4.5 |
| 2007/0272573 A1 | 11/2007 | Gelmetti | |
| 2007/0284354 A1 | 12/2007 | Laymon | 219/137.51 |
| 2008/0149608 A1 * | 6/2008 | Albrecht | B23K 9/123 219/130.1 |
| 2008/0156925 A1 | 7/2008 | Cooper | 242/559.3 |
| 2008/0257874 A1 | 10/2008 | Kaufman et al. | 219/137 R |
| 2008/0257875 A1 | 10/2008 | De Keizer | 219/137.44 |
| 2008/0300349 A1 | 12/2008 | Fuchikami et al. | 524/117 |

(56) References Cited

U.S. PATENT DOCUMENTS

| | | | |
|---|---|---|---|
| 2008/0314876 A1 | 12/2008 | Pinsonneault et al. ......... 219/74 | |
| 2008/0314884 A1* | 12/2008 | Fujiwara ............ B23K 9/0735 | |
| | | | 219/130.51 |
| 2009/0014572 A1 | 1/2009 | Weissbrod et al. | |
| 2009/0014579 A1 | 1/2009 | Bender et al. | |
| 2009/0200284 A1* | 8/2009 | Sanchez ............... B23K 9/1336 | |
| | | | 219/137.51 |
| 2010/0116803 A1 | 5/2010 | Gelmetti ....................... 219/138 | |
| 2010/0301029 A1* | 12/2010 | Meckler ................ B23K 9/095 | |
| | | | 219/130.1 |
| 2011/0042355 A1 | 2/2011 | Gelmetti ............. B23K 9/1333 | |
| 2011/0073703 A1 | 3/2011 | Gelmetti et al. .......... 242/615.2 | |
| 2011/0094911 A1 | 4/2011 | Gelmetti ...................... 206/408 | |
| 2011/0114523 A1 | 5/2011 | Gelmetti ...................... 206/407 | |
| 2011/0114617 A1 | 5/2011 | Gelmetti et al. ........... 219/137.9 | |
| 2011/0132880 A1 | 6/2011 | Kossowan ................. 219/76.14 | |
| 2011/0220629 A1* | 9/2011 | Mehn .................... B23K 9/125 | |
| | | | 219/136 |
| 2012/0160819 A1 | 6/2012 | Enyedy .................... 219/137.71 | |
| 2012/0298630 A1 | 11/2012 | Stoutamire ..................... 219/75 | |
| 2013/0112676 A1 | 5/2013 | Hutchison ............... B23K 9/09 | |
| | | | 9/9 |
| 2013/0180971 A1* | 7/2013 | Peters ..................... B65H 51/10 | |
| | | | 219/137.7 |
| 2013/0193124 A1 | 8/2013 | Peters ...................... 219/121.63 | |
| 2013/0193259 A1 | 8/2013 | Weissbrod et al. ............ 242/566 | |
| 2013/0200055 A1 | 8/2013 | Enyedy .................... 219/130.21 | |
| 2014/0076872 A1* | 3/2014 | Ott ........................ B23K 9/1087 | |
| | | | 219/132 |

FOREIGN PATENT DOCUMENTS

| | | | |
|---|---|---|---|
| CN | 202240091 | 5/2012 | ............ B23K 9/133 |
| DE | 1011840 B | 7/1957 | ............ B21C 47/04 |
| DE | 1082215 | 11/1957 | ............ B21C 47/10 |
| DE | 1 154 624 | 8/1960 | ............ C08G 59/40 |
| DE | 2122958 | 11/1972 | ............ B21C 47/14 |
| DE | 2 148 348 | 4/1973 | ............ F01D 7/04 |
| DE | 2202177 | 7/1973 | ............ B65H 54/80 |
| DE | 2525938 | 12/1976 | ............ B23K 9/18 |
| DE | 26 46 218 | 4/1977 | ............ C07F 9/32 |
| DE | 28 16 100 | 10/1978 | ............ C08G 63/68 |
| DE | 36 09 839 | 10/1989 | ............ F16L 57/00 |
| DE | 19909214 | 3/1999 | ............ C08J 9/20 |
| DE | 19958697 | 6/1999 | ............ B01J 20/00 |
| DE | 100 06 592 | 2/2000 | ............ C08G 59/18 |
| DE | 199 10 128 | 4/2001 | ............ A61B 1/008 |
| DE | 10202839 | 1/2002 | ............ B01J 13/00 |
| DE | 103 60 466 | 7/2005 | ............ B23K 9/133 |
| DE | 102007015946 | 10/2008 | ............ B23K 9/133 |
| DE | 202011104120 | 1/2012 | ............ B23K 9/133 |
| EP | 0017445 | 10/1980 | ............ B65H 59/10 |
| EP | 0408259 | 4/1992 | |
| EP | 0519424 A1 | 12/1992 | ............ B23K 9/1333 |
| EP | 0584056 | 2/1994 | ............ B65D 85/04 |
| EP | 0665 166 | 1/1995 | ............ B65D 5/44 |
| EP | 0686439 A1 | 12/1995 | ............ B21C 47/14 |
| EP | 0806429 | 11/1997 | ............ C07F 9/655 |
| EP | 1057751 A1 | 12/2000 | |
| EP | 1 070 754 | 1/2001 | ............ C09K 21/10 |
| EP | 1 275 595 | 1/2003 | ............ B65D 85/04 |
| EP | 1 295 813 | 3/2003 | ............ B65D 85/04 |
| EP | 1357059 | 10/2003 | ............ B65D 85/04 |
| EP | 1 471 024 | 10/2004 | ............ B65H 49/08 |
| EP | 1 698 421 | 6/2006 | ............ B23K 9/133 |
| EP | 1 974 846 | 1/2008 | ............ B23K 9/133 |
| EP | 2 256 064 | 1/2010 | ............ B65H 49/08 |
| EP | 2 354 039 | 1/2010 | ............ B65D 85/04 |
| EP | 2 168 706 | 3/2010 | ............ B23K 9/133 |
| EP | 2 268 950 | 2/2011 | ............ B23K 9/133 |
| EP | 2695696 | 2/2014 | ............ B23K 9/12 |
| EP | 2949416 | 12/2015 | ............ B23K 9/133 |
| FR | 1215111 | 4/1960 | ............ B21C 47/10 |
| FR | 2055181 | 5/1971 | ............ B23K 35/02 |
| FR | 2 267 255 | 4/1974 | |
| FR | 2595674 | 3/1998 | |
| FR | 2 888 825 | 1/2007 | ............ B65H 57/14 |
| GB | 880502 | 10/1961 | ............ B21C 47/14 |
| GB | 1168928 | 10/1968 | ............ D07B 7/10 |
| GB | 1229913 | 4/1974 | ............ B21C 47/14 |
| GB | 1 575 157 | 9/1980 | ............ C09K 21/12 |
| GB | 2059462 | 4/1981 | ............ A23G 3/02 |
| GB | 2 264 482 | 9/1996 | |
| GB | 2 332 451 | 6/1999 | ............ B65H 57/18 |
| JP | 49-13065 | 2/1974 | |
| JP | 54-035842 | 3/1979 | ............ B65D 1/28 |
| JP | 54-043856 | 4/1979 | ............ B21C 47/08 |
| JP | 55-054295 | 4/1980 | ............ B23K 35/02 |
| JP | S55112176 | 8/1980 | ............ B23K 9/12 |
| JP | 55-156694 | 12/1980 | ............ B23K 35/368 |
| JP | 56-023376 | 3/1981 | ............ B23K 9/00 |
| JP | 57-102471 | 6/1982 | ............ B65H 54/82 |
| JP | 58-035068 | 3/1983 | ............ B23K 9/12 |
| JP | 58-70384 | 5/1983 | ............ B65D 85/04 |
| JP | 59-197386 | 11/1984 | ............ B23K 11/30 |
| JP | 59-229287 | 12/1984 | ............ B23K 9/12 |
| JP | 59-232669 | 12/1984 | ............ B23K 9/12 |
| JP | 60-021181 | 2/1985 | ............ B23K 9/12 |
| JP | 60-032281 | 2/1985 | ............ C04B 41/82 |
| JP | 60-082275 | 5/1985 | ............ B23K 9/12 |
| JP | 60-082276 | 5/1985 | ............ B23K 9/12 |
| JP | 60-184422 | 9/1985 | ............ B21C 47/26 |
| JP | 60-223664 | 11/1985 | ............ C23K 9/12 |
| JP | 61-162541 A | 7/1986 | ............ C08K 5/49 |
| JP | 61-293674 | 12/1986 | ............ B23K 9/12 |
| JP | 62-009774 | 1/1987 | ............ B23K 9/12 |
| JP | 62-111872 | 5/1987 | ............ B65H 48/08 |
| JP | 62-287055 | 12/1987 | ............ C22F 1/10 |
| JP | 63-147781 | 6/1988 | ............ B65H 59/06 |
| JP | 1-65265 | 4/1989 | ............ C23C 14/56 |
| JP | 1-240222 | 9/1989 | |
| JP | 3-264169 | 11/1991 | ............ B23K 9/133 |
| JP | 03264169 A | 11/1991 | ............ B23K 9/133 |
| JP | 4-112169 | 4/1992 | ............ B23K 9/12 |
| JP | 04-133973 | 5/1992 | ............ B65H 59/06 |
| JP | 4-274875 | 9/1992 | ............ B21C 47/04 |
| JP | 05104248 A * | 4/1993 | |
| JP | 5-178538 | 7/1993 | ............ B65H 59/06 |
| JP | 7-247058 | 9/1995 | ............ B21C 47/24 |
| JP | 8-40642 | 2/1996 | ............ B21C 47/28 |
| JP | 08-150492 | 6/1996 | ............ B23K 35/02 |
| JP | 08-267274 | 10/1996 | ............ B23K 35/30 |
| JP | 2000-202630 | 7/2000 | ............ B23K 9/133 |
| JP | 2000-225468 | 8/2000 | ............ B23K 9/12 |
| JP | 2000-263239 | 9/2000 | ............ B23K 11/00 |
| JP | 2001-26375 | 1/2001 | ............ B65H 75/16 |
| JP | 2001-150187 | 6/2001 | ............ B21D 3/06 |
| JP | 2001-323268 A | 11/2001 | ............ C07F 9/6574 |
| JP | 2004-025220 | 1/2004 | ............ B23K 9/133 |
| JP | 2004-025242 | 1/2004 | ............ B23K 35/20 |
| JP | 2004-025243 | 1/2004 | ............ B23K 9/12 |
| JP | 2005-169499 | 6/2005 | ............ B23K 9/133 |
| JP | 2007-927 | 1/2007 | ............ B23K 9/133 |
| JP | 2007-29971 | 2/2007 | ............ B23K 9/133 |
| KR | 2002-0077857 | 10/2002 | ............ B65D 85/04 |
| KR | 2004-0059894 | 12/2002 | ............ B23K 9/133 |
| RU | 793678 | 1/1981 | ............ B21C 47/02 |
| RU | 1412830 | 7/1998 | ............ B21C 47/02 |
| WO | WO 81/03319 | 11/1981 | ............ B65D 25/52 |
| WO | WO 8810230 | 12/1988 | ............ B65H 49/08 |
| WO | WO 94-00493 | 1/1994 | ............ A61K 39/00 |
| WO | WO 94-19258 | 9/1994 | ............ B65D 5/10 |
| WO | WO 97/00878 | 1/1997 | ............ C07F 9/6571 |
| WO | WO 98/52844 | 11/1998 | ............ B65D 85/04 |
| WO | WO 00-50197 | 8/2000 | ............ B23C 19/00 |
| WO | WO 01/27365 | 4/2001 | ............ D01H 4/28 |
| WO | WO 02/094493 | 11/2002 | |
| WO | WO 03-106096 A | 12/2003 | ............ B21C 47/20 |
| WO | WO 2005/005704 | 1/2005 | ............ D04H 13/02 |
| WO | WO2005042201 | 5/2005 | ............ B23K 9/133 |
| WO | WO 2005/061168 | 7/2005 | |
| WO | 2006091075 | 8/2006 | ............ B23K 9/133 |
| WO | WO 2007/010171 | 1/2007 | ............ B65H 57/00 |

(56) References Cited

FOREIGN PATENT DOCUMENTS

| WO | WO 2007/112972 | 11/2007 | ............ B23K 9/133 |
| WO | WO 2007/149689 | 12/2007 | ............ B65H 57/18 |
| WO | WO 2009/007845 | 1/2009 | ............ B23K 9/133 |
| WO | WO2009027784 | 3/2009 | ............ B23K 9/133 |
| WO | WO 2009/143917 | 12/2009 | ............ B65H 57/14 |
| WO | WO 2011/147565 | 1/2011 | ............ B23K 9/133 |
| WO | WO 2013/092658 | 6/2013 | ............ B65H 57/18 |

OTHER PUBLICATIONS

"International Plastics Flammability Handbook" Jurgen Troitzsch, $2^{nd}$ edition, 1990, pp. 33, 43-49 and 59.
Chinese Official Action dated Mar. 17, 2010.
EPO Office Action issued for related application No. 09753572.8, dated May 2, 2012 (5 pgs).
European Office Action for corresponding application No. 10 014 553.1-2302, dated Apr. 3, 2012 (4 pgs).
European Office Action issued for 09777298.2, dated Aug. 31, 2012 (4 pgs).
European Search Report, dated Mar. 2, 2011 (7 pgs).
European Search Report, dated Sep. 17, 2008.
Hansen et al., "Water Absorption and Mechanical Properties of Electrospun Structured Hydrogels", Journal of Applied Polymer Science, vol. 95, pp. 427-434 (2005).
International Preliminary Report on Patentability issued for related application No. PCT/EP2009/001285, dated Nov. 30, 2010 (7 pgs).
International Preliminary Report on Patentability, dated Sep. 16, 2010 (5 pgs).
International Preliminary Report, PCT/IPEA/409, 7 pages.
International Search Report and Written Opinion issued in corresponding PCT Appln. No. PCT/EP2009/005246, dated Apr. 6, 2010 (9 pgs).
International Search Report issued in Applicants' underlying PCT Application Serial No. PCT/EP09/001285, dated Feb. 24, 2009 (3 pgs).
International Search Report, dated Jul. 6, 2009 (3 pgs).
Korean Official Action dated May 16, 2011, Appln. No. 2008-7005433, (3 pgs).
Office Action issued for related U.S. Appl. No. 12/618,250, dated Apr. 26, 2012 (11 pgs).
PCT International Search Report, dated Nov. 6, 2008.
Plaza et al., Preparation of ethylenebis(nitrilodimethylene)tetrakis(phenylphosphinic acid), Inorganic Synthesis, vol. 16, No. 199, abstract, one page.
Search Report received in Applicant's counterpart European Patent Application Serial No. 08017572.2-2302.
Search Report received in Applicant's counterpart European Patent Application Serial No. 10014216.5-1256 (8 pages), dated Apr. 14, 2011.
Search Report received in Applicant's counterpart European Patent Application Serial No. 11000892.7-2302 (8 pages), dated Jul. 19, 2011.
Search Report received in Applicant's counterpart European Patent Application Serial No. 11000236.7 (8 pages), dated Aug. 4, 2011.
Ullmanns Encyclopedia of Industrial Chemistry, Sulfuric Acid & Sulfur Trioxide to Tetrahydrofuran, Superabsorbents, $6^{th}$ Edition, vol. 35, pp. 73, 80, 86 and 89 (2003).
U.S. Official Action dated Feb. 13, 2012, issued in U.S. Appl. No. 12/917,320 (14 pgs).
U.S. Official Action dated Dec. 14, 2012, issued in U.S. Appl. No. 12/994,686 (17 pgs).
U.S. Official Action dated Mar. 5, 2013 issued in U.S. Appl. No. 13/382,491 (33 pgs).
Notice of Allowance dated Mar. 5, 2013 issued in U.S. Appl. No. 12/593,271 (15 pgs).
Notice of Allowance dated Mar. 18, 2013 issued in U.S. Appl. No. 12/994,686 (10 pgs).
Office Action issued in related U.S. Appl. No. 12/572,994, dated Apr. 24, 2013 (22 pgs).
Italian Search Report issued in related application No. MI20121423, dated Apr. 29, 2013 (2 pgs).
Office Action issued in related U.S. Appl. No. 13/382,491, dated Jul. 11, 2013 (15 pgs).
U.S. Office Action issued in related U.S. Appl. No. 12/572,994, dated Sep. 17, 2013 (13 pgs).
Extended European Search Report issued in related application No. 13179908.2, dated Nov. 13, 2013 (6 pgs).
Office Action issued in related U.S. Appl. No. 13/330,314, dated Feb. 28, 2014 (10 pgs).
Office Action issued in related U.S. Appl. No. 13/330,314, dated Jun. 20, 2014 (14 pgs).
Office Action issued in related U.S. Appl. No. 12/293,271 dated Aug. 31, 2012 (7pgs).
Office Action issued in related U.S. Appl. No. 12/572,994 dated Nov. 25, 2011 (11 pgs).
Office Action issued in related U.S. Appl. No. 12/572,994 dated Aug. 12, 2011 (13pgs).
Office Action issued in related U.S. Appl. No. 12/789,095 dated Jun. 12, 2012 (8pgs).
Notice of Allowance issued in related U.S. Appl. No. 12/917,320 dated Jun. 18, 2012 (25 pgs).
European Search Report issued in application No. 16160312.1, dated Sep. 19, 2016 (7 pgs).
Office Action issued in U.S. Appl. No. 14/195,497, dated Sep. 9, 2016 (21 pgs).
Office Action issued in U.S. Appl. No. 14/481,722, dated Nov. 4, 2016 (18 pgs).
Office Action issued in U.S. Appl. No. 14/195,497, dated May 19, 2016 (35 pgs).
Office Action issued in U.S. Appl. No. 14/481,722, dated Jun. 14, 2016 (25 pgs).
Office Action issued in U.S. Appl. No. 14/195,497, dated Mar. 23, 2017 (24 pgs).
Office Action issued in U.S. Appl. No. 13/912,016, dated Apr. 21, 2017 (25 pgs).
European Office Action issued in application No. 16180212.9, dated Jan. 19, 2017 (7 pgs).
Office Action issued in U.S. Appl. No. 14/481,722, dated Jan. 26, 2017 (16 pgs).
Office Action issued in U.S. Appl. No. 14/679,768, dated Jan. 30, 2017 (57 pgs).
Office Action issued in U.S. Appl. No. 14/195,497, dated Sep. 7, 2017 (29 pgs).
Office Action issued in U.S. Appl. No. 14/481,722, dated Jul. 17, 2017 (23 pgs).
Office Action issued in U.S. Appl. No. 14/679,768, dated Aug. 2, 2017 (33 pgs).
Office Action issued in U.S. Appl. No. 14/850,753, dated Aug. 25, 2017 (64 pgs).
Notice of Allowance issued in U.S. Appl. No. 14/850,753, dated Jan. 19, 2018 (14 pgs).
Office Action issued in U.S. Appl. No. 14/481,722, dated Dec. 12, 2017 (16 pgs).
Office Action issued in U.S. Appl. No. 14/679,768, dated Jan. 12, 2018 (26 pgs).
U.S. Appl. No. 14/195,497, filed Mar. 3, 2014, Gelmetti et al.
U.S. Appl. No. 14/481,722, filed Sep. 9, 2014, Gelmetti et al.
U.S. Appl. No. 14/850,753, filed Sep. 10, 2015, Gelmetti et al.
Notice of Allowance issued in U.S. Appl. No. 14/850,753, dated Mar. 27, 2018 (14 pgs).
Office Action issued in U.S. Appl. No. 14/195,497, dated Feb. 23, 2018 (30 pgs).
U.S. Appl. No. 10/526,539, filed Mar. 3, 2005.
U.S. Appl. No. 10/596,697, filed Jun. 21, 2006.
U.S. Appl. No. 11/466,048, filed Aug. 21, 2006.
U.S. Appl. No. 12/545,717, filed Aug. 21, 2009.
U.S. Appl. No. 12/545,720, filed Aug. 21, 2009.
U.S. Appl. No. 12/593,271, filed Sep. 25, 2009.
U.S. Appl. No. 12/572,994, filed Oct. 2, 2009.
U.S. Appl. No. 12/618,165, filed Nov. 13, 2009.
U.S. Appl. No. 12/618,250, filed Nov. 13, 2009.
U.S. Appl. No. 12/691,554, filed Jan. 21, 2010.

(56) References Cited

OTHER PUBLICATIONS

U.S. Appl. No. 12/789,095, filed May 27, 2010.
U.S. Appl. No. 12/994,686, filed Nov. 24, 2010.
U.S. Appl. No. 13/330,314, filed Dec. 19, 2011.
U.S. Appl. No. 13/382,491, filed Jan. 5, 2012.
U.S. Appl. No. 13/744,394, filed Jan. 17, 2013.
U.S. Appl. No. 13/912,016, filed Jun. 6, 2013.
U.S. Appl. No. 14/030,879, filed Sep. 18, 2013.
U.S. Appl. No. 14/195,497, filed Mar. 3, 2014.
U.S. Appl. No. 14/481,722, filed Sep. 9, 2014.
U.S. Appl. No. 14/679,768, filed Apr. 6, 2015.
U.S. Appl. No. 14/850,753, filed Sep. 10, 2015.
U.S. Appl. No. 15/295,797, filed Oct. 17, 2016.
U.S. Appl. No. 14/679,768, filed Apr. 6, 2015, Gelmetti et al.
Notice of Allowance issued in U.S. Appl. No. 14/481,722, dated May 4, 2018 (19 pgs).
Office Action issued in U.S. Appl. No. 14/679,768, dated Jan. 24, 2019 (20 pgs).

* cited by examiner

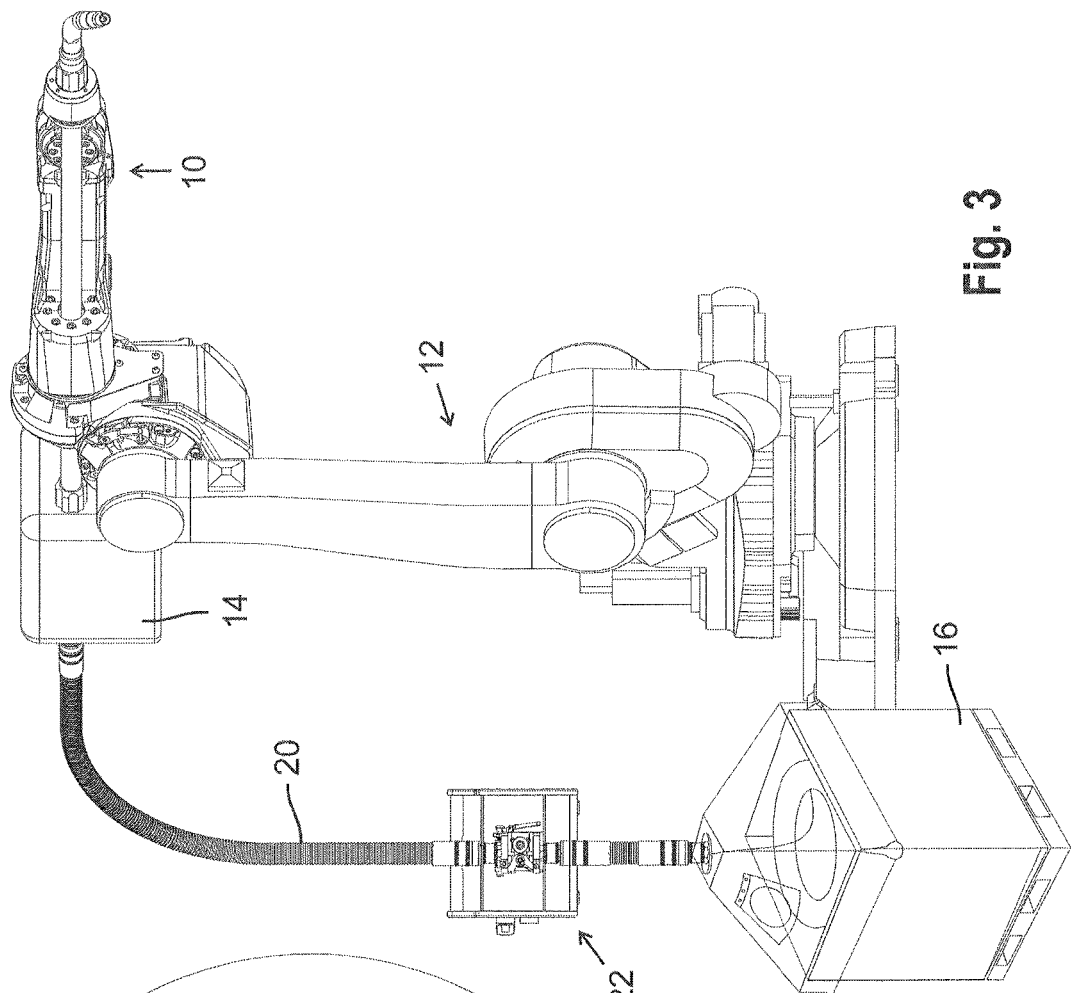
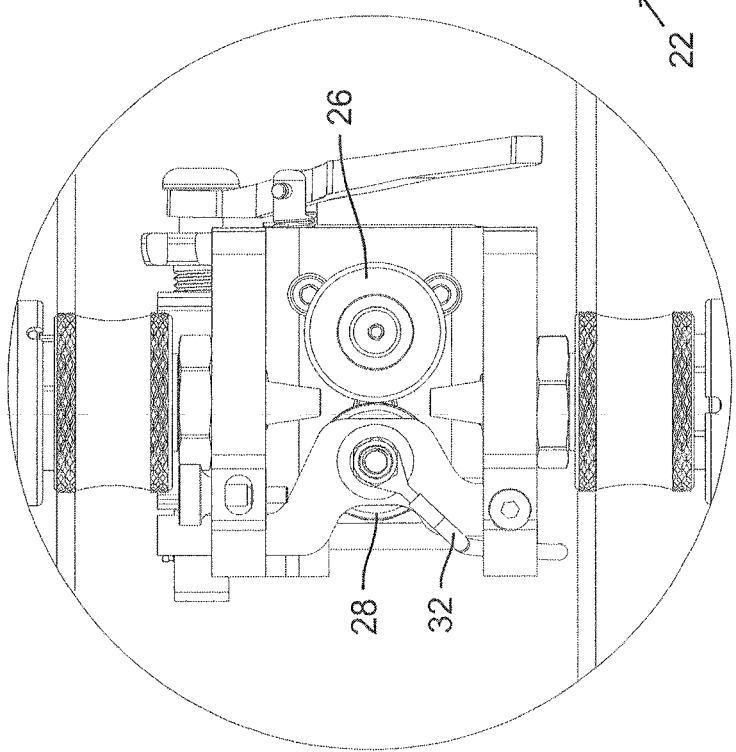

WIRE FEEDING SYSTEM

The invention relates to a wire feeding system, in particular for feeding welding wire.

BACKGROUND OF THE INVENTION

Wire feeding systems are commonly used for feeding welding wires from a supply source, for example a container in which a significant amount (up to several hundred kilograms) of welding wire is being stored, to a point called welding arc where the welding wire is being melt through a welding torch, with the purpose of joining metal parts. Since the welding torch is usually connected to a welding robot and continuously moving, the welding wire has to be fed through a wire guiding liner from the container to the welding torch. The passing of the welding wire through the inevitable bends and curvatures on the wire guiding liner necessarily creates a certain amount of friction and drag. More curves along the wire guiding liner can worsen the problem to the point that it becomes very difficult for the wire feeding system to function properly and to guarantee the necessary smooth feeding.

In conventional welding applications, a single feeding device pulls the wire from the container and feeds it to the welding torch and it is placed between the wire source (the container) and the welding torch. In some other welding applications the feeding device itself contains the wire source in the form of a small spool and feeds the wire to the welding torch.

In robotic and automated applications, which are designed to maximize the productivity, the trend goes towards using large bulk packs containing from few hundred kilograms to more than one ton of welding wire. These bulk containers have to be positioned in a safe area at a significant distance from the device feeding the welding wire to the welding torch and preferably on the floor in a location that can be easily accessed by a forklift. In order to comply with increasingly stricter safety regulations and standards, it is strongly advisable to refrain from placing containers with welding wire high on top of traveling robots, where the maneuver of replacing a used pack with a new one can represent a serious hazard for the robot operators and weight tolerances would only permit the use of containers carrying a limited quantity of welding wire. Placing the packs at the floor undoubtedly offers the significant advantages of making it possible to use heavier containers with more product, for a maximized downtime saving, and of working in a safer environment but it can result in the welding wire having to be pulled over significant distances by the front feeder device from bulk containers towards the welding torch.

Transporting and feeding welding wire over long distances, preferably through guiding liners placed for convenience inside the cable drag chains, is not an easy task and often the main pulling wire feeder close to the welding torch is not capable of reliably advancing the welding wire. To assist the front pulling feeder, systems are known which use the combined action of a so-called master feeder (the wire feeding device close to the welding torch) and a so-called slave wire feeder (a second auxiliary wire feeder installed remotely from the welding torch, close to the wire supply bulk container). Both wire feeders are equipped inside with the software and hardware necessary to synchronize their movements so that the welding wire is being fed to the welding torch by the combined pulling effect of the master feeder and the pushing assistance of the rear slave feeder and this interaction between the two units is possible because both are normally supplied by the same manufacturer but this represents, for the market, a limitation of competitiveness and an increase of costs for the end users.

In the attempt to reduce the dependence from the master and slave feeder manufacturers, less advanced systems are known which employ a so-called feed assisting booster that operates independently from the main wire feeder close to the welding torch. The feed assisting booster detects when the wire feeder is pulling welding wire, and then automatically engages through a clutch or a similar mechanical device. However, the action of the wire feeder close to the welding torch assisted by the independent feeding booster is not as reliable and efficient as the combined synchronized cooperation of master and slave feeding systems. This is due to the fact that the booster feeder always reacts with a certain delay, which increases proportionally with the length of the wire guide liner. When the wire feeder close to the welding torch starts its wire feeding action, a few seconds pass before the feed assisting rear booster recognizes that feeding is required. This is due to the inherent flexibility of the wire guiding system that allows feeding of some centimeters of welding wire into the wire guiding liner (or pulling it from the wire guiding liner) at one end without a consequent immediate movement of the wire at the other end. This effect is known as backlash. The same effect noticeable at a start of the feeding action can be noticed at a stop of the feeding action. The wire feeder close to the welding torch will stop without the booster feeder noticing this immediately. The backlash results in the welding wire not being advanced at the welding torch with the speed and promptness actually requested. In other words, a wire pushing booster, not synchronized and not directly interacting with the wire pulling master feeder, does not promptly and accurately react to the starts and stops commands and the wire feed speed imposed by the master feeder itself and this makes the whole welding process extremely unreliable. A delayed feeding assistance by the booster at the feeding start can cause welding torch contact tip burn-backs and a delayed feeding interruption by the booster can cause the booster rolls to scratch and deform the wire surface.

Since the existing prior art independent wire feed assisting rear boosters are not directly activated by the front feeder and the rear booster pushing action is activated normally by a built-in magnetic clutch or an equivalent mechanical device which detects that wire is eventually being pulled by the front main feeder, they are often suffering from excess over-heating because the booster motor is always in torque, also after the welding action is interrupted and the wire is not being pulled by the front wire feeder; this can contribute to considerably reduce the booster motor lifespan and can represent a fire hazard and a consequent safety issue in the welding robot cell area.

A reliable way to remotely start or stop the rear booster, and still function independently from the main pulling feeder, is represented by the prior art embodiment of a welding wire feeding system having a wire movement sensing device formed as a self-contained stand-alone unit and adapted for being mounted onto a wire guide, and an assisting feeding device for assisting the feeding welding wire depending from signals received from the wire movement sensing device. This technology is based on the idea of actively controlling a feed assisting device, which acts in a manner similar to the known slave booster feeders, by employing the wire movement-sensing device close to the "main" master feeder that is usually the wire feeder close to the welding torch. The wire movement-sensing device is represented by a small unit, which is physically independent from the master feeder and can be mounted at a suitable location along the path of the wire, preferably close to the master feeder. This solution, however, has its drawbacks because in order to make the stand-alone front motion detecting device communicate with the rear feed assist booster, it is still necessary to connect the two units through a hampering cable and this can represent an extra cost and complicate the setup inside the robot cell. Prior art inventions also suggest a simpler way for the two units to interact through a wireless communication, but this solution is not applicable in those manufacturing facilities where Bluetooth communications can interfere with other equipment. In most automotive plants, for example, wireless communications are often banned.

The object of the invention is to provide a wire feeding system allowing a reliable control of the rear booster and the smooth feeding of a welding wire over long distances without involving a complicated or expensive system and without any need of synchronization between the master wire feeder and the assisting booster feeder.

BRIEF DESCRIPTION OF THE INVENTION

Generally speaking, the invention conveniently uses the welding wire itself as the means through which the signal for starting and stopping the rear booster is being transmitted from the front feeder to the auxiliary wire feeder (booster). This permits eliminating the use of hampering cables and to save the cost of the motion detecting device, regardless of the distance between the front pulling feeder and the back booster and the length or the path of the wire guiding liner.

The invention is based on the idea of actively controlling a wire feed assisting device, which acts in a manner similar to the known booster feeders, by detection and consequent instantaneous reaction to any type of signal transmitted through the welding wire itself. In a preferred embodiment, the signal can be the voltage passing through the welding wire as soon as the welding power source or welding machine, supplies tension and the welding arc is struck at the welding torch tip, but also any other type of power line transmitted frequency signal between the front feeder and the feed assisting booster. The detection of this signal is immediate and allows to promptly start or stop the booster motor torque in connection with the actual welding action, thus preventing unnecessary and dangerous overheating of the rear booster unit, improving the accuracy of the wire boost and increasing the booster motor lifespan, with an efficiency comparable to the conventional synchronization between feeder and booster.

Additionally, in a preferred embodiment, the controlling booster software can be programmed to adjust the motor working torque and partially or completely stop the boosting motor torque immediately after the interruption of the welding arc or after an adjustable lapse of time.

In the GMAW (gas metal arc) and other welding processes, as soon as welding voltage and current is supplied by the welding machine and the welding arc is struck, a tension varying from 10 to 40 Volts, travels through the welding wire electrode; consequently, the main wire feeder simultaneously starts pulling and feeding wire from the bulk container into the welding torch, since the two actions are inter-connected. The present invention detects and advantageously exploits the presence or absence of tension signal on the welding wire, which is the equivalent of the start or stop of the main feeder, and simultaneously translates it, through the booster components and software, into a command to start or stop of the rear booster motor torque. Since the rear booster and the front main feeder are not connected and the two speeds are not synchronized, the booster software can perform a variety of additional functions like, for example, controlling the motor torque and pushing a bit more than the front feeder in order to compensate the backlash by filling with welding wire all the free space at the liner curvatures, or it can stop the motor torque partially or completely after a few seconds of welding inactivity.

Specifically, the invention provides an auxiliary wire feeder, having a pushing device for advancing welding wire, a control device for controlling the pushing device, and an electrical contact adapted for being in electrical connection with the welding wire, the electric contact being connected to a control device for supplying a control signal to the control device. The electric contact allows to directly transmit the control signal from the welding wire to the control device without the need of any external cable or other connection between the main feeder and the auxiliary wire feeder.

Preferably, at least one pulley is provided which is adapted for cooperating with the welding wire, the pulley forming the electrical contact. This embodiment uses one of the pulleys which are necessary anyhow within the auxiliary wire feeder, for transmitting the control signal from the welding wire to the control device.

According to an embodiment of the invention, the pulley can be connected to the pushing device for advancing the welding wire. In other words, the electrical contact here is one and the same element which actively advances the welding wire.

In an alternative embodiment, the pulley is a pressing pulley for pressing the welding wire against a drive pulley connected to the pushing device. In this embodiment, the electrical contact is one of the passive pulleys of the auxiliary wire feeder.

According to an embodiment of the invention, one of the pulleys which engages the welding wire is formed from PEEK. This material is particularly suitable for advancing aluminum welding wire as it does not scratch the surface of the welding wire. Using PEEK is particularly suitable for the drive pulley.

In one embodiment of the invention, the electrical contact is a collector ring contact. This contact can be arranged at a suitable position within the auxiliary wire feeder for taking the control signal from the welding wire.

According to an embodiment of the invention, the control device comprises a voltmeter relay. A voltmeter relay is responsive to the voltage present in the welding wire and starts the auxiliary wire feeder as soon as a certain threshold of the voltage is exceeded.

The pushing device of the auxiliary wire feeder can comprise an electric motor or a pneumatic motor. Both electric power and compressed air are sources of energy which are readily available in a plant.

While it is preferred that there is an external electrical power supply for the auxiliary wire feeder in case it comprises an electric motor, it is in theory possible to derive the electrical power for operating the auxiliary wire feeder directly from the welding wire. Thus, an auxiliary wire feeder is formed which does not require an external power supply and takes the presence of the welding voltage in the welding wire as a start signal for the feeding operation and at the same time uses the welding voltage for driving the pushing device.

Preferably, a slip clutch is provided in the force flow path from the pushing device to the welding wire for preventing creation of excessive torque. Such slip clutch prevents overheating of an electric motor in case the motor constantly tries to advance the welding wire with a speed which is higher than the speed of the main wire feeder.

The invention also provides a welding system having a welding torch, a main wire feeder, a wire guide for guiding welding wire from a supply to the welding torch, a welding wire current contact for supplying welding current to the welding wire, and an auxiliary wire feeder as discussed above. The auxiliary wire feeder ensures that the welding wire is being advanced with the necessary precision even if the wire guide extends over a significant distance such as 20 to 50 meters or even above, between a supply of the welding wire and the welding torch.

Furthermore, the invention provides a method for controlling an auxiliary wire feeder in a welding system having a welding torch, a main wire feeder, a wire guide for guiding welding wire from a supply to the welding torch, a welding current contact for supplying welding current to the welding wire, an auxiliary wire feeder having a pushing device for advancing welding wire, a control device for controlling the pushing device, and an electrical contact connected to the control device for supplying a control signal to the control device and adapted for being in an electrical contact with the welding wire, the control being responsive to an electrical signal transmitted via the welding wire.

In one embodiment of the invention, the electrical signal is the electrical potential (also referred to as "voltage") present between the welding wire and ground. This embodiment uses the fact that an electrical potential between the welding wire and ground is generated only when the welding torch is in operation. Accordingly, the presence of a certain electrical potential (typically between 10 and 40 Volts) between the welding wire and ground is a clear indication that the welding process is ongoing and that there is a need to advance the welding wire. Conversely, the fact that no electrical potential is present between the welding wire and ground is a clear indication that no welding takes place and that there is no need to advance the welding wire.

Preferably, the control device interprets the electrical potential being higher than a predefined threshold as a signal for operating the pushing device. This threshold is chosen such that the voltage present during a welding process is, despite significant fluctuation during the welding process, above this threshold. Taking into account that the voltage measured between the welding wire and ground typically varies between 10 and 40 Volts during a welding process, the threshold can be set to be 5 or 8 Volts.

In an alternative embodiment, the main wire feeder applies a control signal to the welding wire. Such control signal can be a modulated signal which is transmitted in a manner similar to bus systems and can contain information not only as to when to start and when to stop the auxiliary wire feeder but also information as to the requested feeding speed.

According to an embodiment, the control device shuts down the pushing device, after receiving a signal for stopping the pushing device, with a stop delay. This ensures that any backlash within the wire guide is compensated by the additional amount of welding wire provided by the auxiliary wire feeder.

According to an embodiment, the control device completely stops the pushing device after an adjustable lapse of time to prevent an overheated condition.

BRIEF DESCRIPTION OF THE DRAWINGS

The invention will now be described with reference to the enclosed drawings. In the drawings, FIG. 1 schematically shows a welding system according to an embodiment of the invention in a shutdown condition, FIG. 3 shows the system of FIG. 1 in a different view, FIG. 6 shows a second detail of the auxiliary wire feeder of FIG. 4.

DETAILED DESCRIPTION OF THE INVENTION

Figure 1:
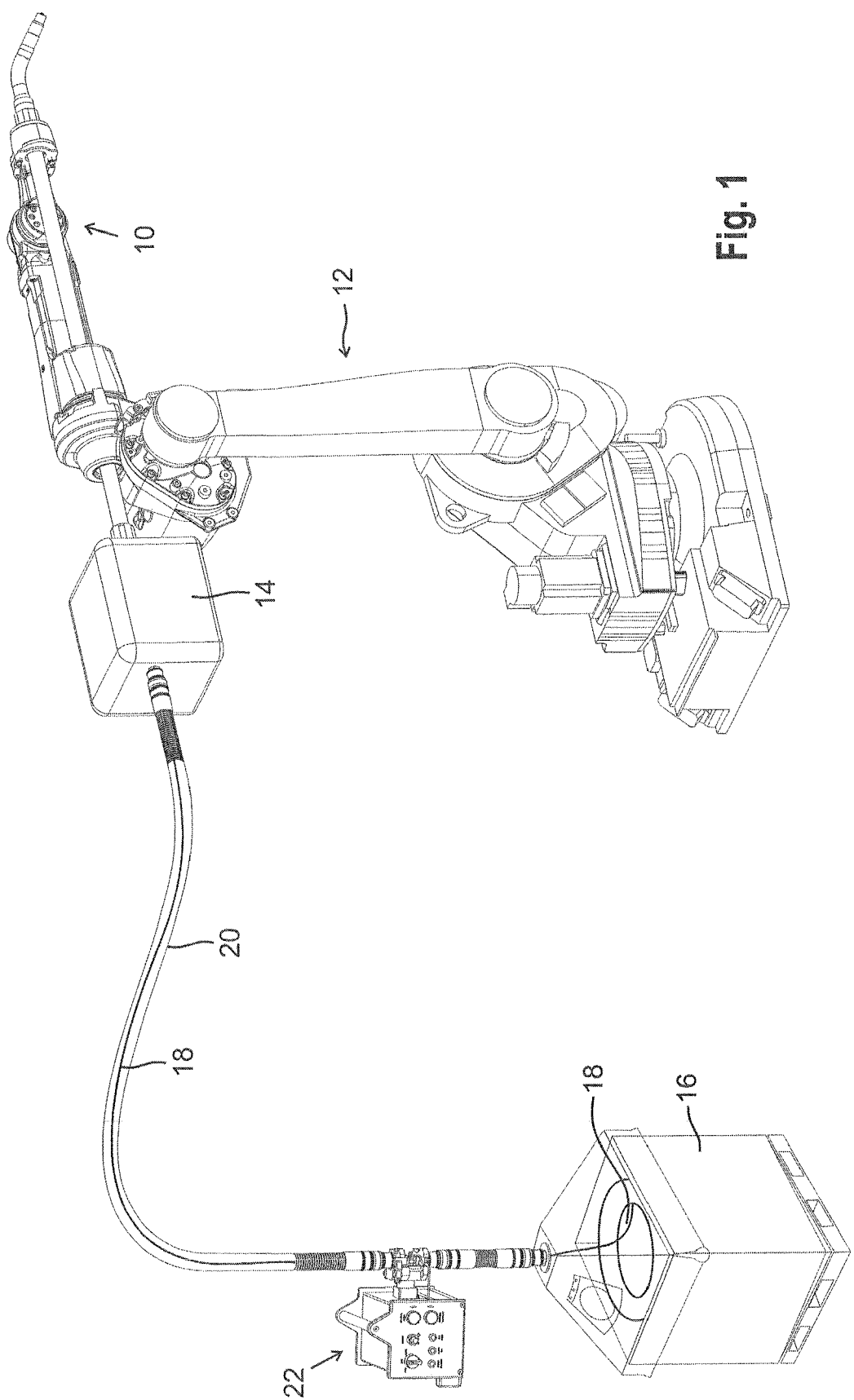
Figure 2:
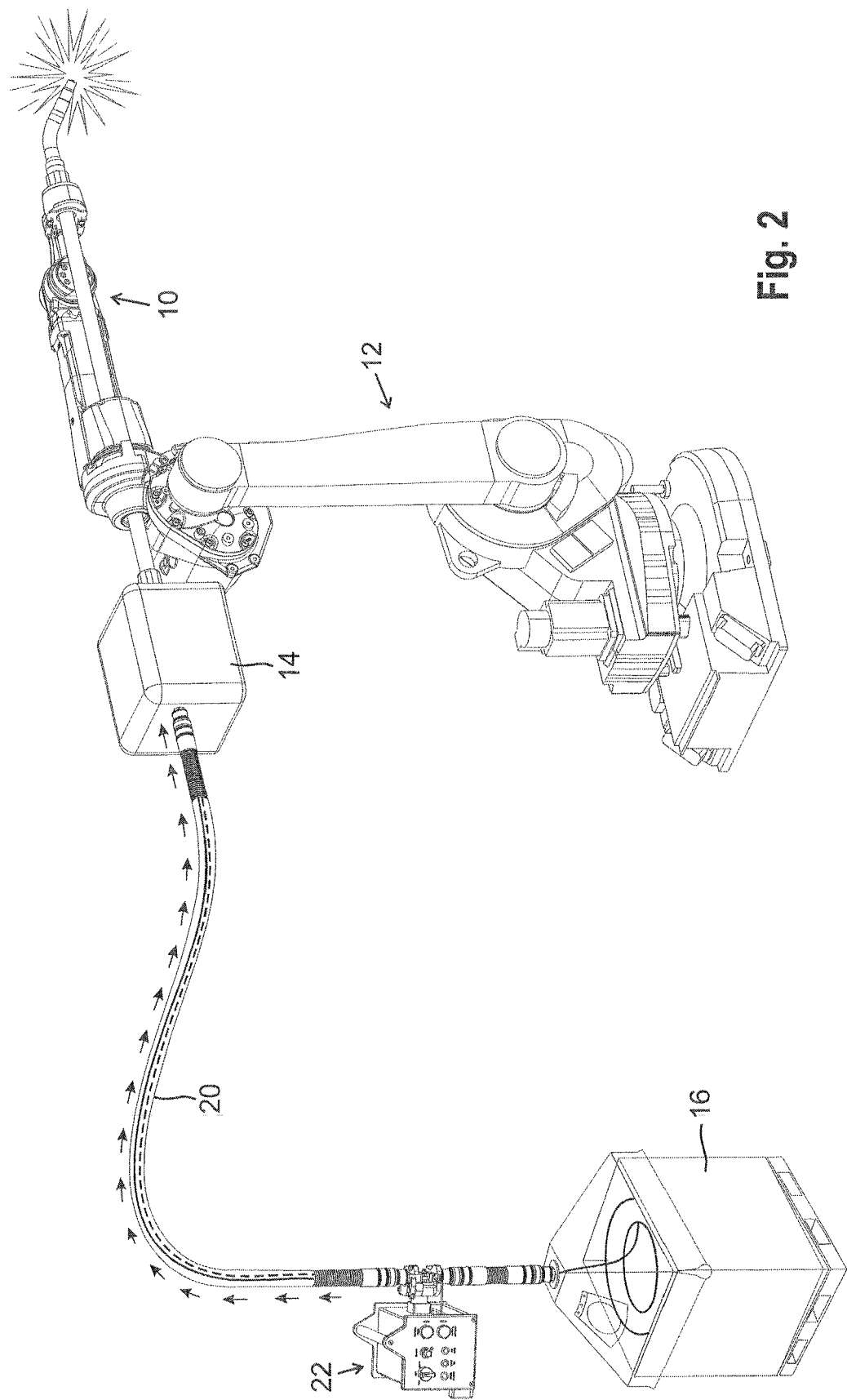
FIG. 2 shows the system of FIG. 1 during a welding operation.
Figure 5:
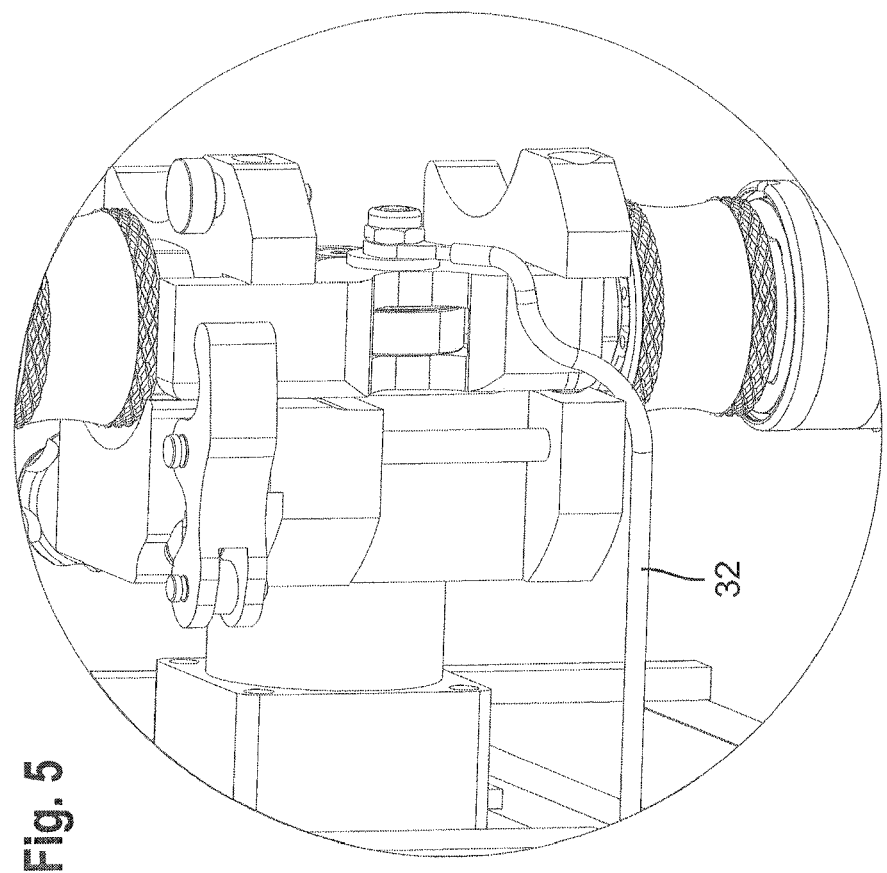
FIG. 5 shows a detail of the auxiliary wire feeder of FIG. 4.

In FIGS. 1, 2 and 3, a welding system is shown which comprises a welding torch 10 which is here mounted to a welding robot 12, a main feeder for feeding welding wire to the welding torch 10, and a welding wire supply 16. Welding wire supply 16 is here a bulk container which can comprise a coil formed from several hundred kilograms of welding wire.

In view of its weight and further in view of considerations such as accessibility etc., welding wire supply 16 is usually arranged at a distance from welding torch 10. Welding wire 18 from welding wire supply 16 is guided towards main feeder 16 and welding torch 10 by means of a wire guide 20. Wire guide 20 can be any device which allows to reliably guide the welding wire from welding wire supply 16 towards welding torch 10. Preferably, wire guide 20 is formed from a plurality of interconnected bodies which each rotatably support a couple of rolls. The rolls guide the welding wire 18 in the interior of the bodies with low friction while at the same time ensuring that the wire guide 20 can follow the movements of welding torch 10.

At a suitable location between welding wire supply 16 and main feeder 14 and preferably close to welding wire supply 16, an auxiliary wire feeder (also referred to as "booster feeder") 22 is arranged. The purpose of auxiliary wire feeder 22 is to provide a pushing effect on welding wire 16 for pushing the welding wire towards main feeder 14, or to at least assist the effect of main feeder 14.

Auxiliary wire feeder 22 comprises a pushing device (briefly shown with reference numeral 24 in FIG. 4) for advancing the welding wire. Pushing device 24 preferably comprises an electric motor which cooperates with a drive pulley 26 (please see FIG. 6).

The welding wire is biased against drive pulley 26 by means of a pushing pulley 28 so that any rotational movement of drive pulley 26 generated by means of pushing device 24, is transmitted into a longitudinal movement of the welding wire, advancing the welding wire towards main feeder 14.

Drive pulley 26 can be formed from PEEK. Pushing pulley 28 is preferably formed from steel or a similar, electrically conductive material.

Figure 4:
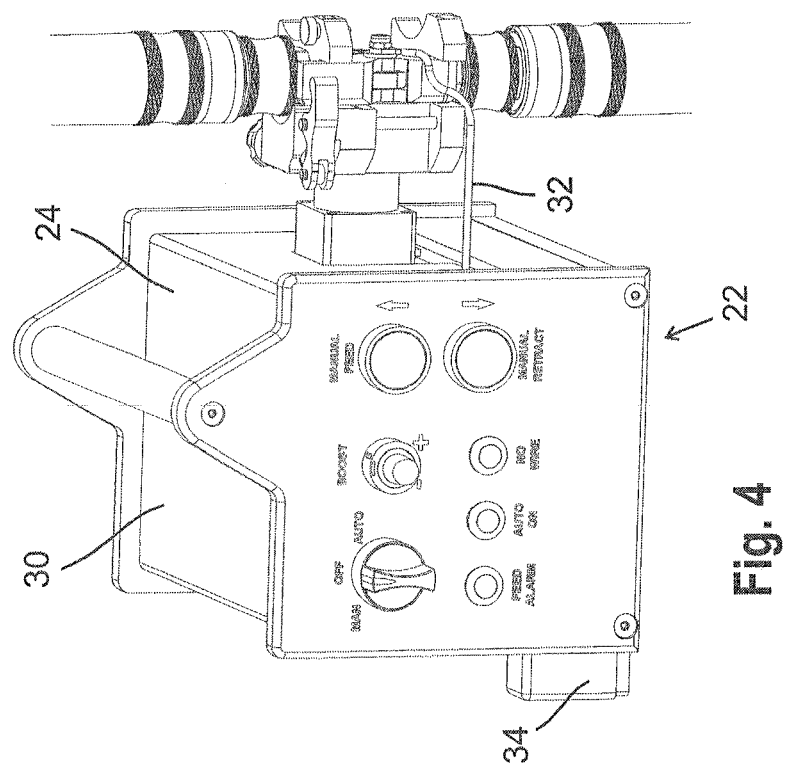
FIG. 4 shows at an enlarged scale the auxiliary wire feeder as used in the welding system of FIG. 1.

Pushing device 24 is controlled by means of a control device 30 (please see FIG. 4). Control device 30 controls operation of pushing device 24 (meaning in particular the start and the stop of pushing device 24) and can also control the speed of operation of the pushing device.

Control device 30 is responsive to a control signal which is transmitted via welding wire 18. The control signal in particular is the presence of a certain electrical potential ("voltage") between welding wire 18 and ground. In particular, the electrical potential is the electrical potential which is used for generating a welding arc (please see FIG. 2) at the welding torch for generating a welding seam.

The electrical signal present in welding wire 18 is sensed by control device 30 by means of an electrical contact which is in electrical connection with welding wire 18. In the embodiment shown in the drawings, the electrical contact is formed by pushing pulley 28 which is connected via a transmission cable 32 to control device 30.

Auxiliary wire feeder 22 is furthermore provided with electric power by means of a power connector 34. The electrical power supplied via connector 34 is in particular used for operation of pushing device 24.

As long as the welding system is in the condition of FIG. 1 where no welding seam is being formed, no electrical potential is generated between welding wire 18 and ground. This is interpreted by control device 30 of auxiliary wire feeder 22 as an indication that there is no need for advancing the welding wire.

When a welding seam is to be generated, an electrical potential of typically approximately 40 Volts is applied between welding wire 18 and ground. Approximately at the same time, main feeder 14 advances the welding wire, and a welding arc is generated at the tip of welding torch 10. Then, the electrical potential between the welding wire and ground drops to a value of approximately 10 Volts, and welding continues.

As soon as the electrical potential is generated between welding wire 18 and ground, this is sensed by control device 30 via the electrical connection established between the welding wire and the control device by means of pushing pulley 28 and cable 32. The presence of the electrical potential is interpreted by control device 30 as a request that welding wire is being advanced, and control device 30 starts pushing device 24. Accordingly, auxiliary wire feeder 22 advances the welding wire towards main feeder 14.

When the welding process is to be stopped, the electrical potential generated between welding wire 18 and ground is removed, and the welding arc extinguishes. The drop of the voltage sensed by control device 30 is interpreted as an indication that no more welding wire is to be advanced towards main feeder 14. Accordingly, control device 30 shuts down pushing device 24. This can be done with a certain delay of one or two seconds, if desired.

The invention claimed is:

1. A method for controlling an auxiliary wire feeder in a welding system having a welding torch, a main wire feeder, a wire guide guiding welding wire from a supply to the welding torch, a welding current contact supplying welding current to the welding wire, the auxiliary wire feeder having a pushing device advancing welding wire, a control device controlling the pushing device, and an electrical contact connected to the control device supplying a control signal to the control device and being electrically connected to the welding wire for picking up an electrical voltage signal on the welding wire, the control device being responsive to when the electrical voltage signal is supplied to the welding wire, sensing when the welding current is supplied to the welding wire, and powering the auxiliary wire feeder on and off, independently of the main wire feeder, in response to when the electrical voltage signal is picked up on the welding wire as a result of the welding current being supplied to the welding wire, wherein the control device comprises a voltmeter relay.

2. The method of claim 1 wherein the electrical voltage signal is the electrical potential present between the welding wire and ground.

3. The method of claim 2 wherein the control device interprets the electrical potential being above a predefined threshold as a signal for operating the pushing device.

4. The method of claim 1 wherein the main wire feeder applies the control signal to the welding wire.

5. The method of claim 1 wherein the control device shuts down the pushing device, after receiving a signal for stopping the pushing device, with a stop delay.

6. The method of claim 1 wherein the control device completely stops the pushing device after an adjustable lapse of time to prevent an overheated condition.

7. The method of claim 1 wherein the auxiliary wire feeder includes at least one pulley for cooperating with the welding wire, the pulley forming the electrical contact with the welding wire.

8. The method of claim 7 wherein the pulley is connected to the pushing device for advancing the welding wire.

9. The method of claim 7 wherein the pulley is a pressing pulley for pressing the welding wire against a drive pulley connected to the pushing device.

10. The method of claim 1 wherein the electrical contact is a collector ring contact.

11. The method of claim 1 wherein the pushing device comprises an electric motor.

12. The method of claim 1 wherein a slip clutch is provided in a force flow path from the pushing device to the welding wire for preventing creation of excessive torque.

* * * * *